(12) United States Patent
Shi et al.

(10) Patent No.: US 10,673,611 B2
(45) Date of Patent: Jun. 2, 2020

(54) DATA TRANSMISSION METHOD, DEVICE, AND SYSTEM

(71) Applicant: Huawei Technologies Co., Ltd., Shenzhen, Guangdong (CN)

(72) Inventors: Xiaoli Shi, Shanghai (CN); Hongzhuo Zhang, Shanghai (CN); Haiyan Luo, Shanghai (CN); Wenjie Peng, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/112,416

(22) Filed: Aug. 24, 2018

(65) Prior Publication Data
US 2018/0367292 A1    Dec. 20, 2018

Related U.S. Application Data

(63) Continuation of application No. PCT/CN2016/075154, filed on Mar. 1, 2016.

(51) Int. Cl.
*H04L 29/06*    (2006.01)
*H04L 9/00*     (2006.01)
(Continued)

(52) U.S. Cl.
CPC ............ *H04L 9/006* (2013.01); *H04L 9/0656* (2013.01); *H04L 9/08* (2013.01); *H04W 12/0017* (2019.01);
(Continued)

(58) Field of Classification Search
CPC ...... H04L 9/006; H04L 9/0656; H04W 12/06; G06F 21/445
See application file for complete search history.

(56) References Cited

U.S. PATENT DOCUMENTS 7,382,882 B1    6/2008 Immonen
2011/0078453 A1   3/2011 Mueck et al.
(Continued)

FOREIGN PATENT DOCUMENTS

CN    1316152 A    10/2001
CN   102625300 A    8/2012
(Continued)

*Primary Examiner* — Dao Q Ho
(74) *Attorney, Agent, or Firm* — Womble Bond Dickinson (US) LLP (57) ABSTRACT

The present disclosure discloses a data transmission method, device, and system, and belongs to the field of communications technologies. The method includes: receiving a data packet sent by user equipment, where the data packet carries indication information used to instruct a base station to establish a specified data connection to the user equipment; generating a first key of the user equipment based on the indication information and a public key of the base station; and performing data transmission with the user equipment based on the first key of the user equipment. According to the data transmission method, the transmitted data can be encrypted and decrypted when there is no radio resource control connection between the base station and the user equipment, thereby improving data transmission security while ensuring data transmission efficiency.

9 Claims, 6 Drawing Sheets

(51) Int. Cl.
    *H04W 12/04*     (2009.01)
    *H04L 9/08*     (2006.01)
    *H04W 12/00*     (2009.01)
    *H04W 12/06*     (2009.01)
    *H04W 76/10*     (2018.01)
    *H04L 9/06*     (2006.01)

(52) U.S. Cl.
    CPC ........... *H04W 12/04* (2013.01); *H04W 12/06* (2013.01); *H04W 12/0602* (2019.01); *H04W 76/10* (2018.02); *H04L 2209/80* (2013.01)

(56) References Cited

U.S. PATENT DOCUMENTS

| | | | |
|---|---|---|---|
| 2013/0310006 A1 | 11/2013 | Chen Xinyi et al. | |
| 2014/0146743 A1* | 5/2014 | Gupta | H04L 67/34 370/328 |
| 2014/0355762 A1* | 12/2014 | Zhang | H04W 12/02 380/270 |
| 2015/0189691 A1 | 7/2015 | Zhang et al. | |
| 2017/0250803 A1 | 8/2017 | Zhang et al. | |

FOREIGN PATENT DOCUMENTS

| | | |
|---|---|---|
| CN | 102932784 A | 2/2013 |
| CN | 103297958 A | 9/2013 |
| CN | 103581899 A | 2/2014 |
| CN | 103686619 A | 3/2014 |
| EP | 1343345 A2 | 9/2003 |
| EP | 1095492 B1 | 4/2004 |
| EP | 2882208 A1 | 6/2015 |
| WO | 2015131379 A1 | 9/2015 |

* cited by examiner

DATA TRANSMISSION METHOD, DEVICE, AND SYSTEM

CROSS-REFERENCE TO RELATED APPLICATIONS

This application is a continuation of International Application No. PCT/CN2016/075154, filed on Mar. 1, 2016, the disclosure of which is incorporated herein by reference in its entirety.

TECHNICAL FIELD

The present disclosure relates to the field of communications technologies, and in particular, to a data transmission method, device, and system.

BACKGROUND

With development of communications technologies, data traffic transmitted by using a wireless communications network is becoming greater. Therefore, how to improve data transmission efficiency becomes one of important technical issues in the field of communications technologies.

In the prior art, before data transmission, a radio resource control (RRC) connection needs to be established between user equipment and a base station. To reduce processing resources required for establishment of the radio resource control connection and further improve the data transmission efficiency, a method for directly sending to-be-transmitted data by the user equipment without establishing the RRC connection is provided.

However, in a data transmission process without establishing the RRC connection, when the user equipment is in idle mode, the base station releases context information (Context) of the user equipment. The context information includes information related to security authentication, encryption, and decryption. When the user equipment enters connected mode again and starts to send data, the user equipment cannot exchange the information related to security authentication, encryption, and decryption with the base station, because the radio resource control connection is not established. Consequently, the base station side cannot perform encryption and decryption related processing on the data sent by the user equipment.

In view of this, a data transmission method that enables the base station side to encrypt and decrypt the to-be-transmitted data when the RRC connection is not established is urgently required currently.

SUMMARY

According to a first aspect, to enable a base station side to encrypt and decrypt to-be-transmitted data when no radio resource control connection is established, an embodiment of the present disclosure provides a data transmission method, device, and system, including:

receiving a data packet sent by user equipment, where the data packet carries indication information, and the indication information is used to instruct the base station to establish a specified data connection to the user equipment; generating a first key of the user equipment based on the indication information and a public key of the base station; and performing data transmission with the user equipment based on the first key of the user equipment.

According to such a data transmission method, the transmitted data can be encrypted and decrypted when there is no radio resource control connection between the base station and the user equipment, thereby improving data transmission security while ensuring data transmission efficiency.

In one embodiment, the indication information is a random number generated by the user equipment. According to such a method, the user equipment can conveniently set the indication information, enhancing data transmission efficiency.

In another embodiment, before receiving a data packet sent by user equipment, the method further includes: generating the public key of the base station based on an encryption algorithm and a base station identifier, where the encryption algorithm is determined by the base station. Such a method ensures that the user equipment and the base station use a same encryption and decryption method, implementing encryption and decryption of the transmitted data when there is no radio resource control connection.

In yet another embodiment, before receiving a data packet sent by user equipment, the method further includes: sending identification information of the encryption algorithm to the user equipment, where the identification information of the encryption algorithm is used by the user equipment to obtain the encryption algorithm. According to such a method, the user equipment can obtain the encryption algorithm used by the base station, thereby ensuring that the user equipment and the base station use a same encryption and decryption method, and implementing encryption and decryption of the transmitted data when there is no radio resource control connection.

In still another embodiment, sending identification information of the encryption algorithm to the user equipment includes: sending a security mode command message to the user equipment, where the security mode command message carries the identification information of the encryption algorithm. According to such a method, the user equipment can obtain, without consuming extra sending processing resources, the encryption algorithm used by the base station, enhancing data transmission efficiency.

In one embodiment, the method further includes: broadcasting a system message of the base station, where the system message carries the base station identifier. According to such a method, the user equipment can obtain the base station identifier without consuming extra sending processing resources, enhancing data transmission efficiency.

In another embodiment, after the data packet carrying the indication information is received, the method further includes: sending a key information request to a source base station of the user equipment, where the key information request is at least used to request to obtain an encryption algorithm used by the source base station; generating a second key based on a base station identifier of the base station, the encryption algorithm, and the indication information; and performing data transmission with the user equipment based on the second key. According to such a method, the base station can still encrypt and decrypt the data after the user equipment is moved from the source base station to the base station.

In yet another embodiment, sending a key information request to a source base station includes: sending a configuration update request message to the source base station, where the configuration update request message carries the key information request. According to such a method, the base station can send the key information request to the source base station without consuming extra sending processing resources.

According to a second aspect, to ensure that user equipment and a base station use a same encryption and decryption method when no radio resource control connection is established, so that the base station side can encrypt and decrypt to-be-transmitted data, an embodiment of the present disclosure provides a data transmission method, including:

sending a data packet to the base station, where the data packet carries indication information, and the indication information is used to instruct the base station to establish a specified data connection to the user equipment, so that the base station generates a first key of the user equipment based on the indication information and a public key of the base station; and performing data transmission based on the first key of the user equipment.

According to such a data transmission method, the transmitted data can be encrypted and decrypted when there is no radio resource control connection between the base station and the user equipment, thereby improving data transmission security while ensuring data transmission efficiency.

In one embodiment, before the sending a data packet to the base station, the method further includes: generating a random number; and adding the random number as the indication information to the data packet. According to such a method, the user equipment can conveniently set the indication information, enhancing data transmission efficiency.

In another embodiment, before sending a data packet to the base station, the method further includes: obtaining an encryption algorithm and a base station identifier of the base station; and generating the first key of the user equipment based on the encryption algorithm, the base station identifier, and the indication information. According to such a method, the user equipment can obtain the encryption algorithm used by the base station and the base station identifier, thereby ensuring that the user equipment and the base station use a same encryption and decryption method, and implementing encryption and decryption of the transmitted data when there is no radio resource control connection.

In yet another embodiment, obtaining an encryption algorithm and a base station identifier of the base station includes: receiving identification information, sent by the base station, of the encryption algorithm; and obtaining the encryption algorithm based on the identification information of the encryption algorithm. According to such a method, the user equipment can obtain, without consuming extra sending processing resources, the encryption algorithm used by the base station and the base station identifier, enhancing data transmission efficiency.

In still another embodiment, receiving identification information, sent by the base station, of the encryption algorithm includes: receiving a security mode command message sent by the base station, where the security mode command message carries the identification information of the encryption algorithm. According to such a method, the user equipment can obtain, without consuming extra sending processing resources, the encryption algorithm used by the base station, enhancing data transmission efficiency.

In one embodiment, obtaining an encryption algorithm and a base station identifier of the base station includes: receiving a system message broadcast by the base station, where the system message carries the base station identifier, and obtaining the base station identifier based on the system message. According to such a method, the base station can still encrypt and decrypt the data after the user equipment is moved from a source base station to the base station.

In another embodiment, before sending a data packet to the base station, the method further includes: adding a user equipment identifier to the data packet, where the user equipment identifier is used to determine a source base station of the user equipment, so that the base station sends a key information request to the source base station after receiving the data packet. According to such a method, the base station can send the key information request to the source base station without consuming extra sending processing resources.

According to a third aspect, to implement the data transmission method in the first aspect, the present disclosure provides a base station. The base station includes a plurality of function modules, and is configured to implement the data transmission method in the first aspect, so that transmitted data can be encrypted and decrypted when there is no radio resource control connection between the base station and user equipment, thereby improving data transmission security while ensuring data transmission efficiency.

According to a fourth aspect, to implement the data transmission method in the second aspect, the present disclosure provides user equipment. The user equipment includes a plurality of function modules, and is configured to implement the data transmission method in the second aspect, so that transmitted data can be encrypted and decrypted when there is no radio resource control connection between a base station and the user equipment, thereby improving data transmission security while ensuring data transmission efficiency.

According to a fifth aspect, to implement the data transmission method in the first aspect, the present disclosure provides a base station, including a transmitter, a receiver, a memory, and a processor that is connected to the transmitter, the receiver, and the memory.

The processor is configured to:

receive, by using the receiver, a data packet sent by user equipment, where the data packet carries indication information, and the indication information is used to instruct the base station to establish a specified data connection to the user equipment;

generate a first key of the user equipment based on the indication information and a public key of the base station; and perform data transmission with the user equipment based on the first key of the user equipment by using the receiver and the transmitter.

In one embodiment, the indication information is a random number generated by the user equipment.

In one embodiment, the processor is configured to generate the public key of the base station based on an encryption algorithm and a base station identifier, where the encryption algorithm is determined by the base station.

In one embodiment, the processor is configured to send identification information of the encryption algorithm to the user equipment by using the transmitter, where the identification information of the encryption algorithm is used by the user equipment to obtain the encryption algorithm.

In one embodiment, the processor is configured to send a security mode command message to the user equipment by using the transmitter, where the security mode command message carries the identification information of the encryption algorithm.

In one embodiment, the processor is configured to broadcast a system message of the base station by using the transmitter, where the system message carries the base station identifier.

In one embodiment, the processor is configured to: send a key information request to a source base station of the user equipment by using the transmitter, where the key information request is at least used to request to obtain an encryption algorithm used by the source base station; receive, by using the receiver, a key information response sent by the source base station, where the key information response includes identification information of the encryption algorithm; generate a second key based on a base station identifier of the base station, the encryption algorithm, and the indication information; and perform data transmission with the user equipment based on the second key by using the receiver and the transmitter.

In one embodiment, the processor is configured to send a configuration update request message to the source base station by using the transmitter, where the configuration update request message carries the key information request.

According to a sixth aspect, to implement the data transmission method in the second aspect, the present disclosure provides user equipment, including a processor and a memory configured to store an instruction that can be executed by the processor. The processor is configured to: send a data packet to a base station by using a communications component, where the data packet carries indication information, and the indication information is used to instruct the base station to establish a specified data connection to the user equipment, so that the base station generates a first key of the user equipment based on the indication information and a public key of the base station; and perform data transmission based on the first key of the user equipment by using the communications component.

In one embodiment, the processor is configured to: generate a random number, and add the random number as the indication information to the data packet.

In one embodiment, the processor is configured to: obtain an encryption algorithm and a base station identifier of the base station, and generate the first key of the user equipment based on the encryption algorithm, the base station identifier, and the indication information.

In one embodiment, the processor is configured to: receive identification information, sent by the base station, of the encryption algorithm, and obtain the encryption algorithm based on the identification information of the encryption algorithm.

In one embodiment, the processor is configured to receive a security mode command message sent by the base station, where the security mode command message carries the identification information of the encryption algorithm.

In one embodiment, the processor is configured to: receive a system message broadcast by the base station, where the system message carries the base station identifier, and obtain the base station identifier based on the system message.

In one embodiment, the processor is configured to add a user equipment identifier to the data packet, where the user equipment identifier is used to determine a source base station of the user equipment, so that the base station sends a key information request to the source base station after receiving the data packet.

According to a seventh aspect, to implement the data transmission methods in the first aspect and the second aspect, the present disclosure provides a data transmission system, including at least one base station and at least one user equipment.

The base station is configured to: receive a data packet sent by the user equipment, where the data packet carries indication information, and the indication information is used to instruct the base station to establish a specified data connection to the user equipment; generate a first key of the user equipment based on the indication information and a public key of the base station; and perform data transmission with the user equipment based on the first key of the user equipment.

The user equipment is configured to: send the data packet to the base station, where the data packet carries the indication information, and perform data transmission based on the first key of the user equipment.

In one embodiment, the system further includes at least one mobility management device and at least one home subscriber server.

Beneficial effects of the technical solutions provided by the embodiments of the present disclosure are as follows:

According to the methods provided in the embodiments of the present disclosure, the transmitted data can be encrypted and decrypted when there is no radio resource control connection between the base station and the user equipment, thereby improving data transmission security while ensuring data transmission efficiency.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
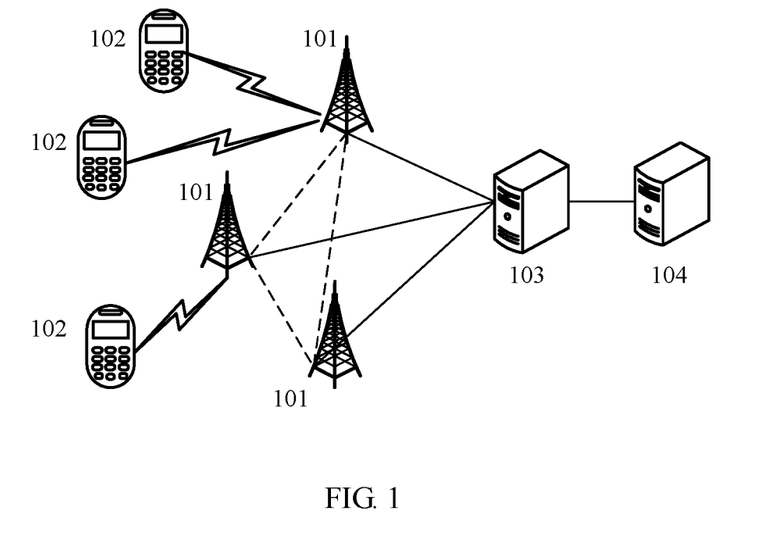
FIG. 1 is a schematic diagram of a data transmission system according to an embodiment.

FIG. 1 is a schematic diagram of a data transmission system according to an embodiment. The data transmission system is configured to execute any data transmission method of the present disclosure. It should be noted that the following is merely an example description of the data transmission system. In actual application, a person skilled in the art should understand that the data transmission system includes but is not limited to an architecture and functions explicitly described in the following descriptions and accompanying drawings. As shown in FIG. 1, the data transmission system includes a base station 101, user equipment 102, a mobility management device 103, and a home subscriber server 104.

Base station 101: The base station is a station that performs information transfer with the user equipment in a specific radio coverage area. The base station 101 may include a receiver, a transmitter, and a processor. In one embodiment, the base station 101 may be an evolved NodeB (eNB), configured to exchange information with the user equipment 102 to execute any data transmission method of the present disclosure.

User equipment 102: The user equipment (UE) is a terminal device having a wireless function. In one embodiment, the user equipment 102 is configured to exchange information with the base station 101 to execute any data transmission method of the present disclosure.

Mobility management device 103: The mobility management device (MME) is configured to perform signaling processing in a data transmission process. The signaling processing may include functions such as network-attached storage (NAS) signaling processing, security control, and idle state mobility control. In one embodiment, the mobility management device 103 is configured to interact with the base station 101 and the home subscriber server 104 to authenticate the user equipment 102.

Home subscriber server 104: The home subscriber server (HSS) 104 is configured to store a configuration file of the user equipment 102, and perform identity authentication and authorization on the user equipment 102, and may provide physical location information of the user equipment 102. In one embodiment, the home subscriber server 104 is configured to interact with the mobility management device 103 to authenticate the user equipment 102.

It should be noted that, in actual application, the data transmission system may further include another network element entity, for example, a serving gateway (SGW) or a public data network gateway (PDN-GW). The other part included in the data transmission system is not limited in the present disclosure.

Figure 2:
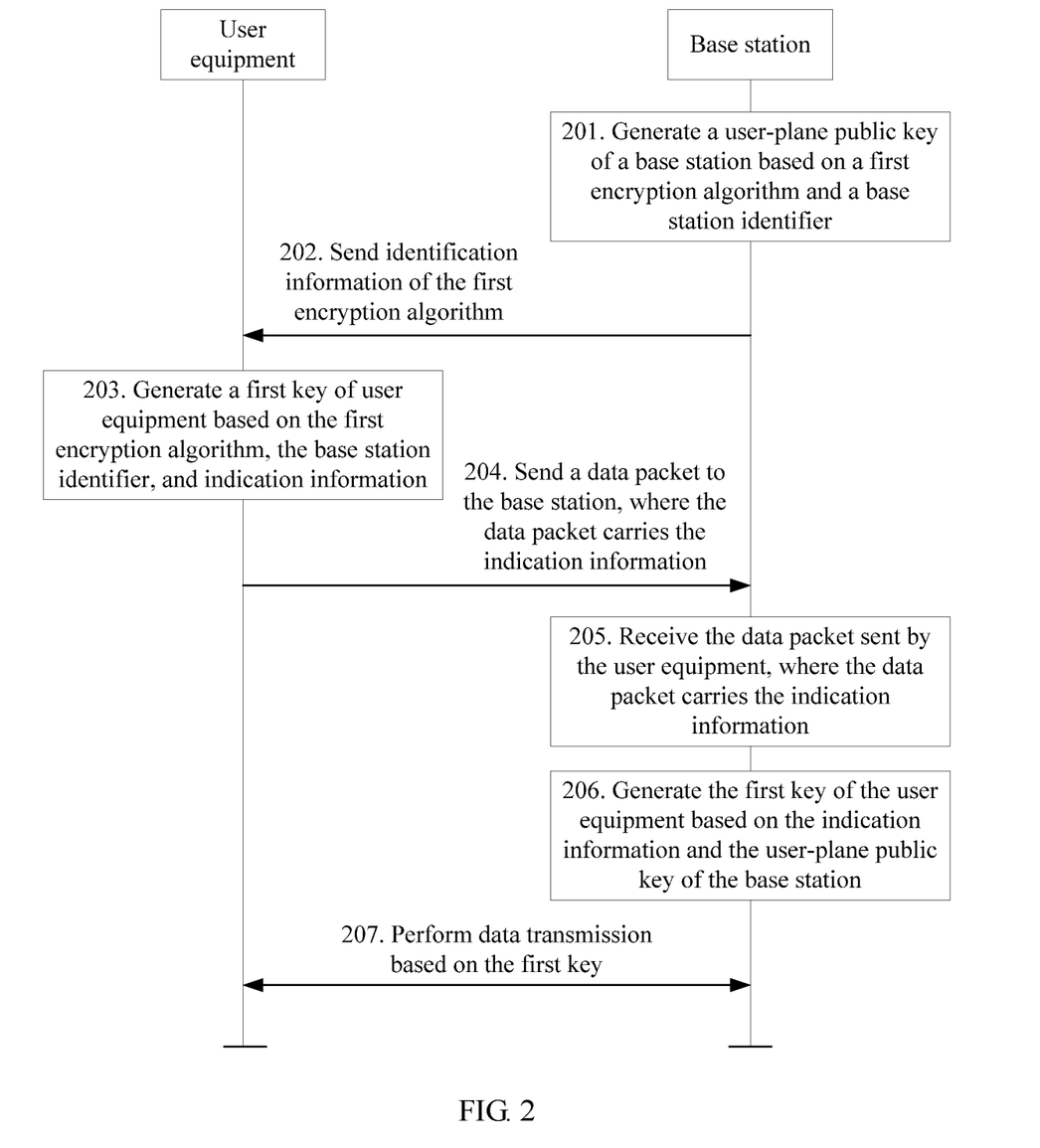
FIG. 2 is a flowchart of a data transmission method according to an embodiment.

FIG. 2 is a flowchart of a data transmission method according to an embodiment. The transmission method is applied to interaction between a base station and user equipment. As shown in FIG. 2, the method includes the following steps.

201. The base station generates a public key of the base station based on an encryption algorithm and a base station identifier.

The public key is a user-plane public key used to derive an encryption key for user-plane data transmission.

The encryption algorithm is determined by the base station, and the base station identifier is used to uniquely identify a base station in a data transmission system. In one embodiment, when there are a plurality of base stations in the data transmission system, different base stations generate their own public keys based on encryption algorithms determined by the base stations and base station identifiers of the base stations. A process of generating the public key of base station specifically includes: using the base station identifier as a parameter to generate a base key according to the encryption algorithm; and generating the public key of the base station based on the base key by using a key derivation function (KDF). The key derivation function is used to generate one or more keys related to encryption or integrity protection. It should be noted that, in actual application, another parameter may also be used in the process of generating the public key. For example, the public key may be generated based on a key of the base station. The key of the base station is a key generated by a mobility management device and transmitted to the base station. The process of generating the public key by the base station is not limited in the present disclosure.

In one embodiment, after generating the public key, the base station stores the public key, so that each time when receiving a data packet sent by the user equipment, the base station directly obtains the public key, instead of generating the public key again.

202. The base station sends identification information of the encryption algorithm to the user equipment, where the identification information of the encryption algorithm is used by the user equipment to obtain the encryption algorithm.

To ensure that an encryption and decryption method of the user equipment is the same as that of the base station when there is no radio resource control connection between the user equipment and the base station. In one embodiment, the base station needs to transmit the identification information of the encryption algorithm to the user equipment after determining the encryption algorithm, so that the user equipment can obtain the encryption algorithm based on the identification information. The identification information of the encryption algorithm may be an algorithm identification (ID) of the encryption algorithm.

In one embodiment, sending the identification information of the encryption algorithm includes: sending a security mode command (SMC) message to the user equipment, where the identification information of the encryption algorithm is added to the security mode command message, so that the security mode command message carries the identification information of the encryption algorithm. It should be noted that, in actual application, the identification information of the encryption algorithm may be transmitted to the user equipment in another manner. The manner of sending the identification information to the user equipment is not limited in the present disclosure. It should be further noted that in one embodiment, sending the identification information of the encryption algorithm to the user equipment may be before or after the public key is generated. The specific occasion is not limited in the present disclosure.

To ensure that the encryption and decryption method of the user equipment is the same as that of the base station when there is no radio resource control connection between the user equipment and the base station, the data transmission method provided in one embodiment further includes: broadcasting, by the base station, a system message of the base station, where the system message carries the base station identifier, so that the user equipment can obtain the base station identifier when receiving the system message. The system message is a broadcast message including at least the base station identifier. In actual application, the system message may further include other content. The other content included in the system message is not limited in the present disclosure. It should be noted that, in actual application, the user equipment may obtain the base station identifier in another manner. For example, the base station identifier is obtained based on a cell global identification (CGI) in the broadcast message. A manner of transmitting the base station identifier to the user equipment is not limited in the present disclosure. It should be further noted that, similar to the specific occasion for sending the identification information of the encryption algorithm, a specific occasion for transmitting the base station identifier to the user equipment may also be before or after the public key is generated. The specific occasion is not limited in the present disclosure.

203. The user equipment generates a first key of the user equipment based on the encryption algorithm, the base station identifier, and indication information.

Before this step, the user equipment generates the indication information. The indication information is used to instruct the base station to establish a specified data connection to the user equipment. The specified data connection is a connection, different from the RRC connection, for performing data communication. In one embodiment, the indication information may be a random number generated by the user equipment by using a randomized algorithm, and the user equipment generates the first key of the user equipment based on the encryption algorithm, the base station identifier, and the random number. The encryption algorithm and the base station identifier are obtained based on the information transmitted from the base station to the user equipment in step 202.

In one embodiment, generating the first key of the user equipment includes: generating the public key of the base station based on the encryption algorithm and the base station identifier, and generating the first key of the user equipment based on the public key and the indication information. It should be noted that, a person skilled in the art should understand that there may be another process of generating the first key of the user equipment. For example, the first key is generated based on the encryption algorithm, the base station identifier, the indication information, and the key derivation function. The process of generating the first key is not limited in the present disclosure.

204. The user equipment sends a data packet to the base station, where the data packet carries the indication information.

To ensure that the encryption and decryption method of the base station is the same as that of the user equipment when there is no radio resource control connection between the base station and the user equipment. In one embodiment, the user equipment adds the indication information generated by the user equipment to the to-be-sent data packet, where the indication information is used to instruct the base station to establish the specified data connection to the user equipment, so that the data packet carries the indication information, and the base station can determine, after receiving the data packet, that the user equipment wants to establish a data connection whose establishment process is simpler than that of the RRC connection. Therefore, the base station may generate a first key same as that of the user equipment based on the indication information.

To conveniently generate the indication information, the indication information is a random number generated by the user equipment. When the data packet is a Media Access Control (MAC) data packet, the random number is added to packet header information of the MAC data packet. It should be noted that, in actual application, the data packet may further carry other information, for example, synchronization information or address information. The other information carried in the data packet is not specifically limited in the present disclosure.

To enable the user equipment to directly encrypt to-be-sent data when sending the data without establishing the radio resource control connection with the base station, the method provided in one embodiment further includes: encrypting the to-be-sent data packet based on the first key of the user equipment, where the to-be-sent data packet is the data packet carrying the indication information. Because the data packet carries the indication information, after obtaining the indication information, the base station may generate the first key based on the indication information, and then decrypt the data packet.

205. The base station receives the data packet sent by the user equipment, where the data packet carries the indication information.

After receiving the data packet sent by the user equipment, the base station extracts the indication information from a specified location of the data packet. In one embodiment, when the data packet is a MAC data packet, the indication information is extracted from a packet header of the MAC data packet.

206. The base station generates the first key of the user equipment based on the indication information and the public key of the base station.

In one embodiment, when the indication information is a random number, the base station generates the first key of the user equipment based on the random number and the public key of the base station. It should be noted that, a person skilled in the art should understand that the first key of the user equipment may be generated by using a specific encryption algorithm. For example, the first key is generated by using the encryption algorithm and the key derivation function. A specific process of generating the first key is not limited in the present disclosure.

207. The base station performs data transmission with the user equipment based on the first key.

To improve data transmission security while enhancing data transmission efficiency, in one embodiment, the user equipment and the base station encrypt and decrypt the to-be-transmitted data by using the encryption algorithm and the first key. It should be noted that, in actual application, a person skilled in the art should recognize that another encryption or decryption parameter or authentication parameter may be derived based on the first key, and data transmission may be performed based on the derived parameter. A specific process of performing data transmission based on the first key is not limited in the present disclosure.

According to such a data transmission method, the transmitted data can be encrypted and decrypted when there is no radio resource control connection between the base station and the user equipment, thereby improving data transmission security while ensuring data transmission efficiency.

After completing an attach procedure through interaction with one base station, the user equipment sends a data packet to the base station. The base station completing the attach procedure is a source base station of the user equipment. In the embodiment shown in FIG. 2, the technical solution provided in the present disclosure is described by using an example in which the user equipment initiates a service to the source base station. In actual application, the following case also exists: The user equipment is handed over from the source base station to another base station and initiates a service to the another base station, where the another base station is a target base station of the user equipment. The following embodiment shown in FIG. 3 describes a scenario in which the user equipment is handed over from the source base station to the target base station.

Figure 3:
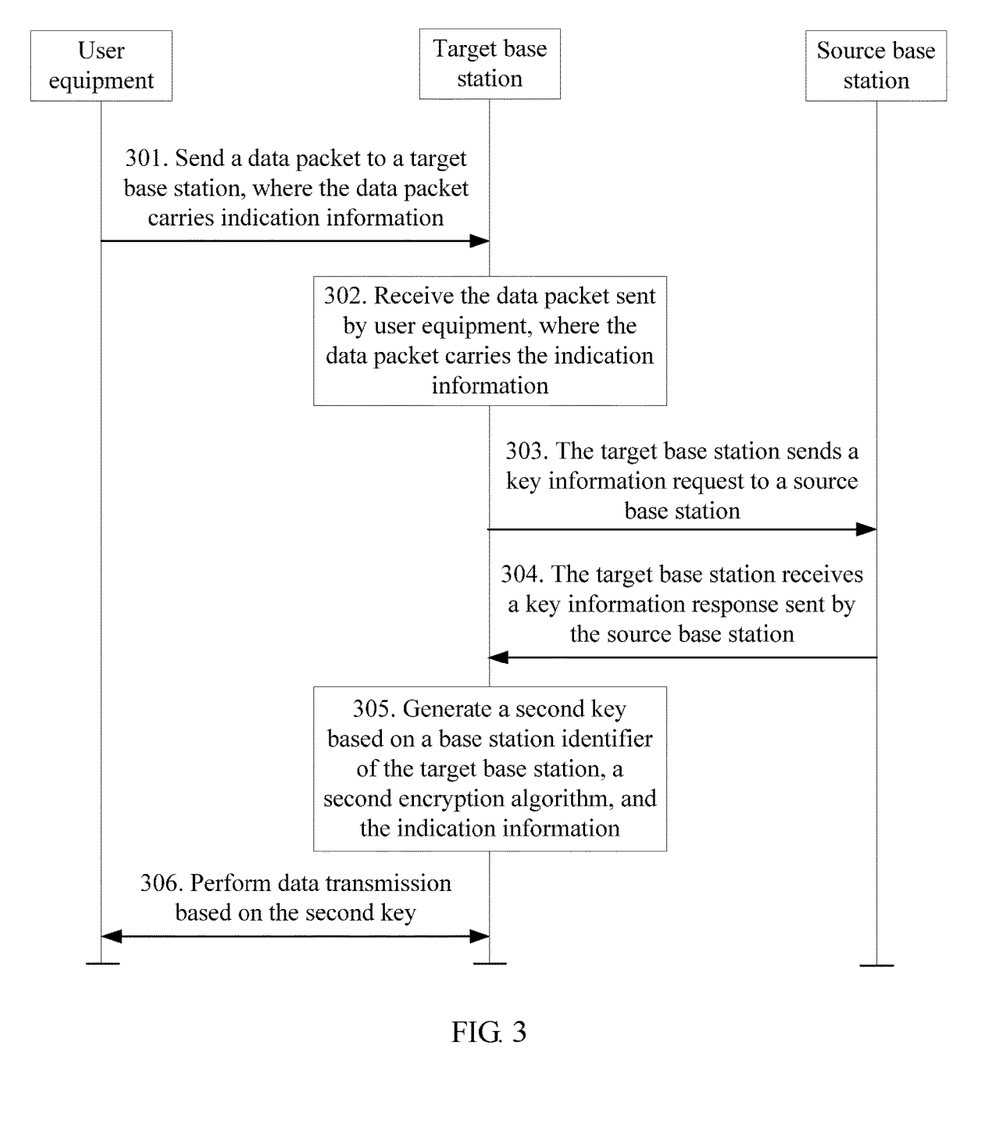
FIG. 3 is a flowchart of a data transmission method according to an embodiment.

FIG. 3 is a flowchart of a data transmission method according to an example embodiment. The transmission method is applied to interaction between a target base station and user equipment. As shown in FIG. 3, the method includes the following steps.

301. The user equipment sends a data packet to the target base station, where the data packet carries indication information.

In one embodiment, the indication information is indication information used during interaction between the user equipment and a source base station, and the indication information is generated by the user equipment. A specific process of sending the data packet to the target base station is similar to the process of sending the data packet to the source base station in the embodiment shown in FIG. 2, and details are not repeated herein.

302. The target base station receives the data packet sent by the user equipment, where the data packet carries the indication information.

In one embodiment, it is determined, based on the data packet sent by the user equipment, whether the user equipment is user equipment served by the source base station. The user equipment served by the source base station indicates user equipment that has been moved from the source base station. If the user equipment is the user equipment served by the source base station, step 303 is performed. If the user equipment is not the user equipment served by the source base station, processing is performed according to the method provided in the embodiment shown in FIG. 2.

In one embodiment, after receiving the data packet sent by the user equipment, the target base station extracts a user equipment identifier from the data packet sent by the user equipment, and determines, based on the user equipment identifier, whether the user equipment is the user equipment served by the source base station. If the user equipment is the user equipment served by the source base station, the target base station determines a base station identifier of the source base station based on the user equipment identifier. Because the user equipment identifier is allocated by the source base station, for example, the user equipment identifier may be a cell radio network temporary identifier, the base station identifier of the source base station to which the user equipment is previously connected may be determined based on the user equipment identifier. It should be noted that, in actual application, to ensure that the target base station can determine the base station identifier of the source base station, the data packet sent by the user equipment may alternatively directly carry the base station identifier of the source base station, so that the step of determining the base station identifier of the source base station based on the user equipment identifier can be skipped. In one embodiment, obtaining the base station identifier of the source base station by the target base station is not limited in the present disclosure. It should be further noted that the user equipment identifier may be in a form of an Internet Protocol (IP) address or the cell radio network temporary identifier (C-RNTI) of the user equipment, or the like. The specific form of the user equipment identifier is not limited in the present disclosure.

303. The target base station sends a key information request to a source base station, where the key information request is at least used to request to obtain an encryption algorithm used by the source base station.

To obtain encryption and decryption information of the user equipment when there is no radio resource control connection between the target base station and the user equipment, in one embodiment, the target base station sends the key information request to the source base station of the user equipment, to obtain the encryption and decryption information of the user equipment.

In one embodiment, to avoid extra sending processing resources, the target base station adds the key information request to a configuration update request message, so that the configuration update request message carries the key information request, and then sends the key information request by sending the configuration update request message.

The key information request is at least used to request to obtain the encryption algorithm. The encryption algorithm is an encryption algorithm used by the source base station when generating a public key. In actual application, the key information request may be further used to request to obtain other information of the user equipment, for example, security capability information. The other information that the key information request is used to request is not limited in the present disclosure.

304. The target base station receives a key information response sent by the source base station, where the key information response includes identification information of the encryption algorithm.

The encryption algorithm is the encryption algorithm used by the source base station when generating the public key. The identification information of the encryption algorithm is used by the target base station to obtain the encryption algorithm.

305. The target base station generates a second key based on a base station identifier of the target base station, the encryption algorithm, and the indication information.

Figure 4:
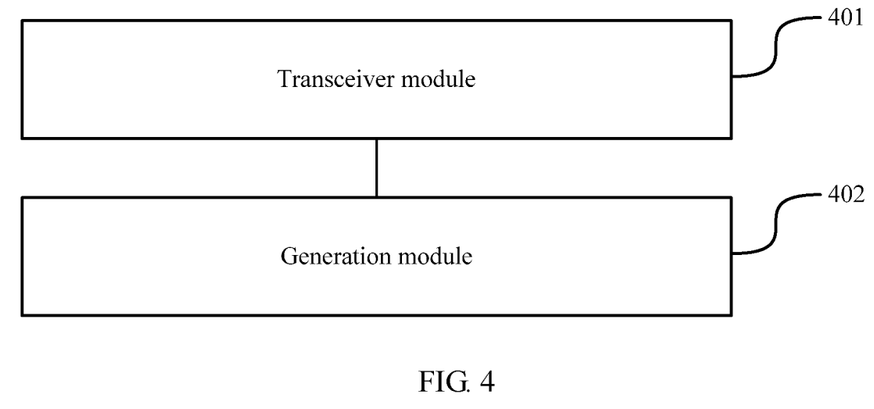
FIG. 4 is a block diagram of a base station according to an embodiment.

A process of generating the second key is similar to the process of generating the first key in the embodiment shown in FIG. 4. Details are not repeated herein for brevity sake.

306. The target base station performs data transmission with the user equipment based on the second key.

A process of performing data transmission based on the second key is similar to the process of performing data transmission based on the first key in the embodiment shown in FIG. 2. Details are not repeated herein for brevity sake.

According to such a data transmission method, the transmitted data can be encrypted and decrypted when there is no radio resource control connection between the target base station and the user equipment. In addition, after the user equipment is moved from the source base station to the target base station, the target base station can still encrypt and decrypt the data, thereby improving data transmission security while ensuring data transmission efficiency.

FIG. 4 is a block diagram of a base station according to an example embodiment. As shown in FIG. 4, the base station includes:

a transceiver module 401 configured to receive a data packet sent by user equipment, where the data packet carries indication information, and the indication information is used to uniquely identify the user equipment; and a generation module 402 configured to generate a first key of the user equipment based on the indication information and a public key of the base station; where the transceiver module 401 is further configured to perform data transmission with the user equipment based on the first key of the user equipment.

According to the base station provided in one embodiment, the transmitted data can be encrypted and decrypted when there is no radio resource control connection between the base station and the user equipment, thereby improving data transmission security while ensuring data transmission efficiency.

In one embodiment, the indication information is a random number generated by the user equipment.

In one embodiment, the generation module 402 is further configured to generate the public key of the base station based on an encryption algorithm and a base station identifier, where the encryption algorithm is determined by the base station.

In one embodiment, the transceiver module 401 is further configured to send identification information of the encryption algorithm to the user equipment, where the identification information of the encryption algorithm is used by the user equipment to obtain the encryption algorithm.

In one embodiment, the transceiver module 401 is further configured to send a security mode command message to the user equipment, where the security mode command message carries the identification information of the encryption algorithm.

In one embodiment, the transceiver module 401 is further configured to broadcast a system message of the base station, where the system message carries the base station identifier.

In one embodiment, the transceiver module 401 is further configured to send a key information request to a source base station of the user equipment, where the key information request is at least used to request to obtain an encryption algorithm used by the source base station;

the transceiver module 401 is further configured to receive a key information response sent by the source base station, where the key information response includes identification information of the encryption algorithm;

the generation module 402 is further configured to generate a second key based on a base station identifier of the base station, the encryption algorithm, and the indication information; and the transceiver module 401 is further configured to perform data transmission with the user equipment based on the second key.

In another embodiment, the transceiver module 401 is further configured to send a configuration update request message to the source base station, where the configuration update request message carries the key information request.

Figure 5:
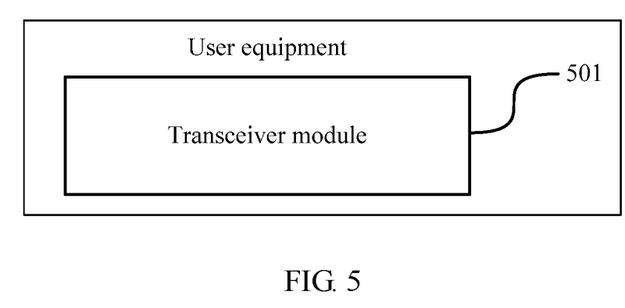
FIG. 5 is a block diagram of user equipment according to an embodiment.

FIG. 5 is a block diagram of user equipment according to an embodiment. As shown in FIG. 5, the user equipment includes:

a transceiver module 501 configured to send a data packet to a base station, where the data packet carries indication information, and the indication information is used to uniquely identify the user equipment, so that the base station generates a first key of the user equipment based on the indication information and a public key of the base station; where the transceiver module 501 is further configured to perform data transmission based on the first key of the user equipment.

In one embodiment, the user equipment further includes: an indication information generation module, configured to: generate a random number, and add the random number as the indication information to the data packet.

In one embodiment, the user equipment further includes: an obtaining module configured to obtain an encryption algorithm and a base station identifier of the base station; and a key generation module configured to generate the first key of the user equipment based on the encryption algorithm, the base station identifier, and the indication information.

In one embodiment, the transceiver module 501 is further configured to receive identification information, sent by the base station, of the encryption algorithm; and the obtaining module is configured to obtain the encryption algorithm based on the identification information of the encryption algorithm.

In one embodiment, the transceiver module 501 is configured to receive a security mode command message sent by the base station, where the security mode command message carries the identification information of the encryption algorithm.

In one embodiment, the transceiver module 501 is further configured to receive a system message broadcast by the base station, where the system message carries the base station identifier; and the obtaining module is configured to obtain the base station identifier based on the system message.

In one embodiment, the user equipment further includes:

a user equipment identification module configured to add a user equipment identifier to the data packet, where the user equipment identifier is used to determine a source base station of the user equipment, so that the base station sends a key information request to the source base station after receiving the data packet.

The transceiver module may be a transmitter, a receiver, or a transceiver. The transceiver module may include a receiving unit and a sending unit, and be implemented as a transceiver in hardware. The base station may further include a controller or the like. The controller may be embedded into or be independent of a processor of the base station in a hardware form, or may be stored in a software form in a memory of the base station, for the processor to invoke to perform the operations corresponding to the foregoing modules. The processor may be a central processing unit (CPU), a microprocessor, a single-chip microcomputer, or the like.

Figure 6:
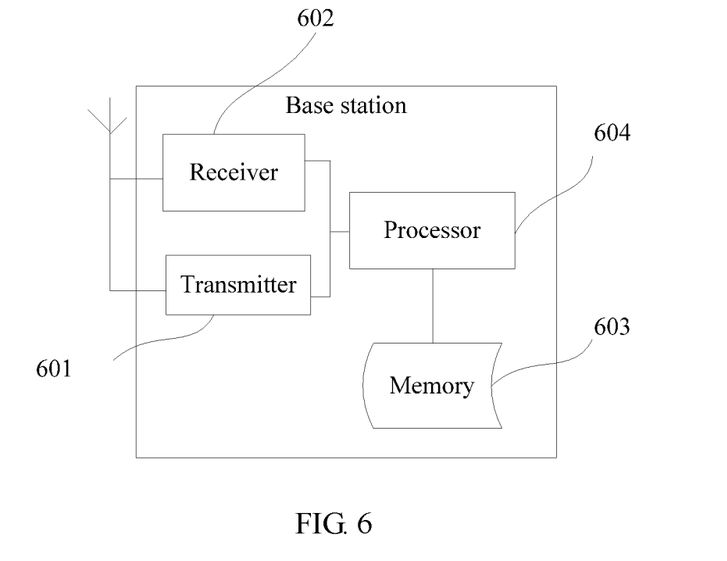
FIG. 6 is a block diagram of a base station according to an embodiment.

FIG. 6 is a block diagram of a base station according to an embodiment. As shown in FIG. 6, the base station includes a transmitter 601, a receiver 602, a memory 603, and a processor 604 that is connected to the transmitter 601, the receiver 602, and the memory 603. In one embodiment, the base station may further include general components such as an antenna, a baseband processing component, an intermediate frequency processing component, and an input/output apparatus. This is not limited in this embodiment of the present disclosure.

The processor is configured to:

receive, by using the receiver 602, a data packet sent by user equipment, where the data packet carries indication information;

generate a first key of the user equipment based on the indication information and a public key of the base station; and perform data transmission with the user equipment based on the first key of the user equipment by using the receiver 602, the transmitter 601, and the memory 603.

In one embodiment, the indication information is a random number generated by the user equipment.

In one embodiment, the processor is configured to generate the public key of the base station based on an encryption algorithm and a base station identifier, where the encryption algorithm is determined by the base station.

In one embodiment, the processor is configured to send identification information of the encryption algorithm to the user equipment by using the transmitter 601, where the identification information of the encryption algorithm is used by the user equipment to obtain the encryption algorithm.

In one embodiment, the processor is configured to send a security mode command message to the user equipment by using the transmitter 601, where the security mode command message carries the identification information of the encryption algorithm.

In one embodiment, the processor is configured to broadcast a system message of the base station by using the transmitter 601, where the system message carries the base station identifier.

In one embodiment, the processor is configured to: if determining that the user equipment is user equipment served by a source base station, send a key information request to the source base station by using the transmitter 601, where the key information request is at least used to request to obtain an encryption algorithm used by the source base station; receive a key information response sent by the source base station, where the key information response includes identification information of the encryption algorithm; generate a second key based on a base station identifier of the base station, the encryption algorithm, and the indication information; and perform data transmission with the user equipment based on the second key by using the receiver 602 and the transmitter 601.

In one embodiment, the processor is configured to send a configuration update request message to the source base station by using the transmitter 601, where the configuration update request message carries the key information request.

For a description of the base station provided in this embodiment of the present disclosure, refer to related content of the method embodiments of the present disclosure. Details are not repeated herein for brevity sake.

Figure 7:
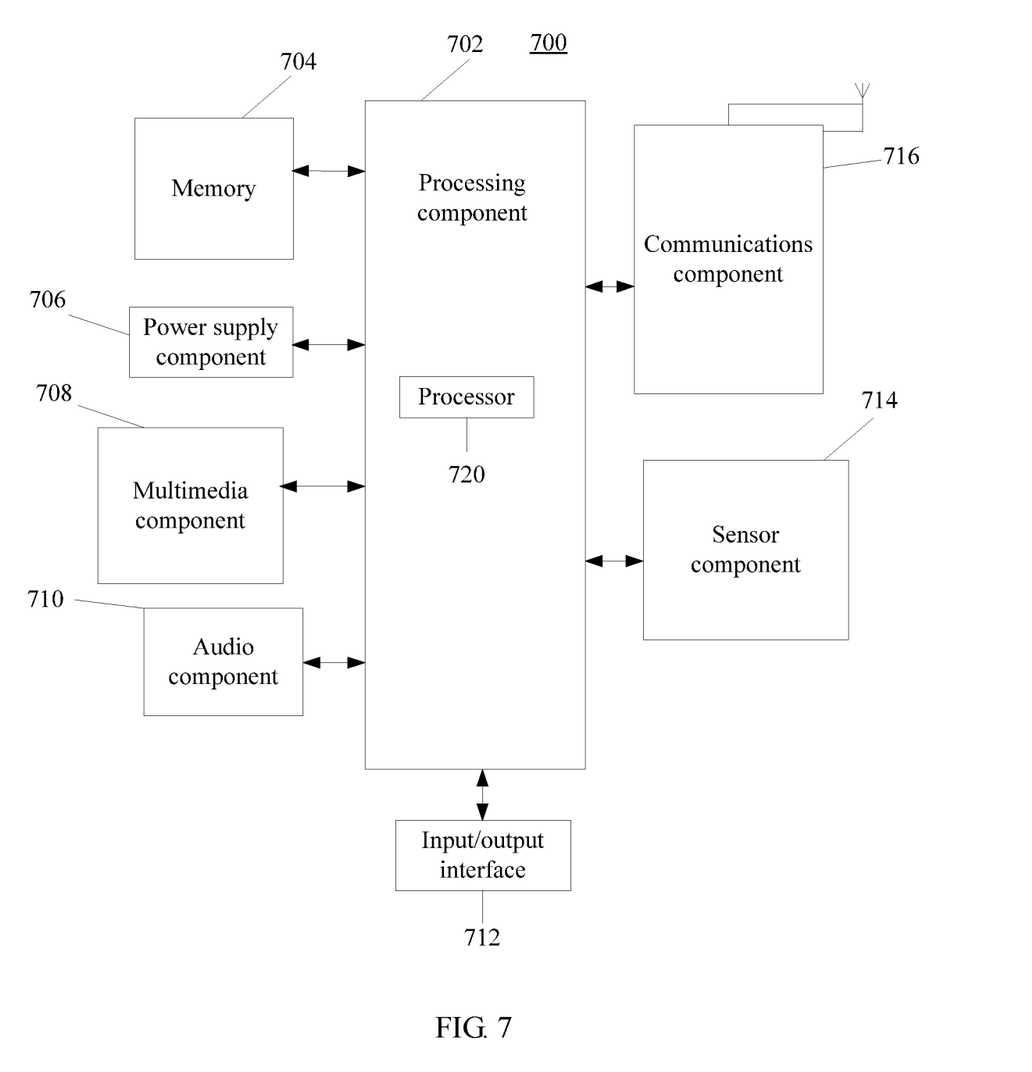
FIG. 7 is a block diagram of user equipment according to an embodiment.

FIG. 7 is a block diagram of user equipment according to an embodiment. For example, the user equipment 700 may be a mobile phone, a computer, a digital broadcasting terminal, a message transceiver device, a game console, a tablet device, a medical device, a fitness facility, a personal digital assistant, or the like.

Referring to FIG. 7, the user equipment 700 may include one or more of the following components: a processing component 702, a memory 704, a power supply component 706, a multimedia component 708, an audio component 710, an input/output (I/O) interface 712, a sensor component 714, and a communications component 716.

The processing component 702 may control overall operations of the user equipment 700, such as operations associated with display, phone calling, data communication, a camera, and recording. The processing component 702 may include one or more processors 720 to execute instructions to perform all or some of the steps of the foregoing methods. In addition, the processing component 702 may include one or more modules to facilitate interaction between the processing component 702 and another component. For example, the processing component 702 may include a multimedia module to facilitate interaction between the multimedia component 708 and the processing component 702.

The memory 704 is configured to store various types of data to support the operations of the user equipment 700. For example, such data includes an instruction used for any application program or method to be operated on the user equipment 700, contact data, address book data, a message, a picture, a video, and the like. The memory 704 may be implemented by any type of volatile or non-volatile storage device or by a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 706 supplies power to various components of the user equipment 700. The power supply component 706 may include a power management system, one or more power sources, and another component related to power generation, management, and distribution for the user equipment 700.

The multimedia component 708 includes a screen, between the user equipment 700 and a user, that provides an output interface. In some embodiments, the screen may be a liquid crystal display (LCD) or a touch panel (TP). If the screen is the touch panel, the screen may be implemented as a touchscreen, to receive an input signal from the user. The touch panel includes one or more touch sensors, to sense a touch, a slide, and a gesture on the touch panel. The touch sensor may not only sense a boundary of the touch or slide action, but also detect duration and a pressure of the touch or slide action. In some embodiments, the multimedia component 708 includes a front camera and/or a rear camera. When the user equipment 700 is in an operating mode, for example, a photographing mode or a video mode, the front camera and/or the rear camera may receive external multimedia data. Each front camera and each rear camera may be a fixed optical lens system, or have focusing and optical zooming capabilities.

The audio component 710 is configured to output and/or input an audio signal. For example, the audio component 710 includes a microphone (MIC). When the user equipment 700 is in the operating mode, for example, a call mode, a recording mode, or a voice recognition mode, the microphone is configured to receive an external audio signal. The received audio signal may be further stored in the memory 704, or be sent via the communications component 716. In some embodiments, the audio component 710 further includes a speaker, configured to output an audio signal.

The I/O interface 712 provides an interface between the processing component 702 and a peripheral interface module. The peripheral interface module may be a keyboard, a click wheel, a button, or the like. The button may be, but is not limited to, a home button, a volume button, a start button, or a lock button.

The sensor component 714 includes one or more sensors, and is configured to provide evaluation of various statuses for the user equipment 700. For example, the sensor component 714 may detect an enabled/disabled state of the user equipment 700 and relative locations of components such as a display and a keypad of the user equipment 700. The sensor component 714 may further detect a location change of the user equipment 700 or a component of the user equipment 700, whether the user and the user equipment 400 are in contact, an orientation or acceleration/deceleration of the user equipment 700, and a temperature change of the user equipment 700. The sensor component 714 may include a proximity sensor, configured to detect presence of an object nearby without any physical contact. The sensor component 714 may further include an optical sensor, such as a CMOS or CCD image sensor, configured to be used in an imaging application. In some embodiments, the sensor component 714 may further include an acceleration sensor, a gyro sensor, a magnetic sensor, a pressure sensor, or a temperature sensor.

The communications component 716 is configured to facilitate wired or wireless communication between the user equipment 700 and another device. The user equipment 700 may be connected to a wireless network based on a communications standard, such as WiFi, 2G, 3G, or a combination thereof. In one embodiment, the communications component 716 receives, through a broadcast channel, a broadcast signal or broadcast-related information from an external broadcast management system. In one embodiment, the communications component 716 further includes a Near Field Communication (NFC) module to facilitate short-range communication. For example, the NFC module may be implemented based on a radio frequency identification (RFID) technology, an Infrared Data Association (IrDA) technology, an ultra-wideband (UWB) technology, a Bluetooth (BT) technology, or another technology.

In one embodiment, the user equipment 700 may be implemented by one or more application-specific integrated circuits (ASIC), a digital signal processor (DSP), a digital signal processing device (DSPD), a programmable logic device (PLD), a field programmable gate array (FPGA), a controller, a microcontroller, a microprocessor, or another electronic element, and is configured to execute any of the foregoing data transmission methods. The method includes: sending a data packet to a base station by using the communications component 716, where the data packet carries indication information, so that the base station generates a first key of the user equipment based on the indication information and a public key of the base station; and performing data transmission based on the first key of the user equipment by using the communications component 716.

In one embodiment, a non-transitory computer readable storage medium including an instruction is further provided, for example, the memory 704 including an instruction. The instruction may be executed by the processor 720 of the user equipment 700 to execute the foregoing methods. For example, the non-transitory computer readable storage medium may be a ROM, a random access memory (RAM), a CD-ROM, a tape, a floppy disk, an optical data storage device, or the like.

In an example embodiment, a non-transitory computer readable storage medium is further provided. When an instruction in the storage medium is executed by a processor of user equipment, the user equipment can execute any of the foregoing data transmission methods.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for data transmission, comprising:
   receiving a data packet sent by user equipment, wherein the data packet carries indication information used to instruct a target base station to establish a specified data connection to the user equipment;
   generating a first key of the user equipment based on the indication information and a public key of the target base station to establish the specified data connection to the user equipment;
   sending a key information request to a source base station of the user equipment, wherein the key information request is at least used to request to obtain an encryption algorithm used by the source base station;
   receiving a key information response sent by the source base station, wherein the key information response comprises identification information of the encryption algorithm;
   generating a second key based on a source base station identifier of the source base station, the encryption algorithm, and the indication information; and
   performing data transmission with the user equipment based on the second key.

2. The method according to claim 1, wherein the indication information is a random number generated by the user equipment.

3. The method according to claim 1, further comprising:
   before receiving the data packet sent by the user equipment,
      generating the public key of the target base station based on an encryption algorithm and a base station identifier of the target base station, wherein the encryption algorithm is determined by the target base station.

4. The method according to claim 3, further comprising:
   before receiving the data packet sent by the user equipment,
      sending identification information of the encryption algorithm of the target base station to the user equipment, wherein the identification information of the encryption algorithm is used by the user equipment to obtain the encryption algorithm of the target base station.

5. The method according to claim 1, wherein sending the key information request to the source base station comprises:
   sending a configuration update request message to the source base station, wherein the configuration update request message carries the key information request.

6. A target base station comprising a receiver, a transmitter and a processor, wherein the processor is configured to:
   receive, through the receiver, a data packet sent by user equipment, wherein the data packet carries indication information used to instruct the target base station to establish a specified data connection to the user equipment;
   generate a first key of the user equipment based on the indication information and a public key of the target base station to establish the specified data connection to the user equipment;
   send, through the transmitter, a key information request to a source base station of the user equipment, wherein the key information request is used to request to obtain an encryption algorithm used by the source base station;
   receive, through the receiver, a key information response sent by the source base station, wherein the key information response comprises identification information of the encryption algorithm;
   generate a second key based on a base station identifier of the source base station, the encryption algorithm, and the indication information; and
   perform, through the receiver and the transmitter, data transmission with the user equipment based on the second key.

7. The target base station according to claim 6, wherein the indication information is a random number generated by the user equipment.

8. The target base station according to claim 6, wherein the processor is further configured to generate the public key of target the base station based on an encryption algorithm and a base station identifier of the target base station, wherein the encryption algorithm is determined by the target base station.

9. The target base station according to claim 8, wherein the processor is further configured to send, through the transmitter, identification information of the encryption algorithm of the target base station to the user equipment, wherein the identification information of the encryption algorithm is used by the user equipment to obtain the encryption algorithm of the target base station.

* * * * *